US006244986B1

(12) United States Patent
Mori et al.

(10) Patent No.: US 6,244,986 B1
(45) Date of Patent: Jun. 12, 2001

(54) SHIFT CONTROL APPARATUS FOR CONTINUOUSLY VARIABLE TRANSMISSION

(75) Inventors: Haruhito Mori, Kawasaki; Yuusuke Minagawa; Ryuichi Murase, both of Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/384,418

(22) Filed: Aug. 27, 1999

Related U.S. Application Data (62) Division of application No. 09/036,041, filed on Mar. 6, 1998, now Pat. No. 6,019,701.

(30) Foreign Application Priority Data

Mar. 7, 1997 (JP) ........................................ 9-53010
Nov. 21, 1997 (JP) .................................... 9-321242

(51) Int. Cl.⁷ ............................ B60K 41/12; G06F 17/00
(52) U.S. Cl. .................................. 477/46; 477/48; 701/55
(58) Field of Search ......................... 477/46, 48; 701/55, 701/56, 212

(56) References Cited

U.S. PATENT DOCUMENTS

| 4,809,177 | 2/1989 | Windle et al. ................... 701/50 X |
| 4,945,483 | 7/1990 | Tokoro ............................. 477/48 X |
| 5,136,495 | 8/1992 | Tokoro et al. .................... 477/48 X |
| 5,514,046 | 5/1996 | Petersmann et al. ................ 477/39 |
| 5,555,502 | 9/1996 | Opel ..................................... 701/50 |
| 5,707,313 | 1/1998 | Suzuki ................................. 477/43 |
| 5,730,680 | 3/1998 | Toukura ............................. 477/46 |
| 5,854,988 | 12/1998 | Davidson et al. .................... 701/50 |
| 5,908,461 | * 6/1999 | Tsukamoto et al. ............ 477/120 X |
| 5,931,886 | * 8/1999 | Moroto et al. ........................ 701/54 |
| 5,976,054 | * 11/1999 | Yasuoka .............................. 477/48 |
| 6,019,701 | * 2/2000 | Mori et al. ........................... 477/46 |
| 6,049,750 | * 4/2000 | Adachi et al. .................... 477/46 X |
| 6,066,070 | * 5/2000 | Ito et al. .............................. 477/48 |
| 6,086,506 | * 7/2000 | Petersmann et al. ................. 477/46 |

FOREIGN PATENT DOCUMENTS

| 0 364 270 | 10/1989 | (EP) . |
| 8-145139 | 6/1996 | (JP) . |
| 8-326891 | 12/1996 | (JP) . |

* cited by examiner

Primary Examiner—Charles A Marmor
Assistant Examiner—Roger Pang
(74) Attorney, Agent, or Firm—Foley & Lardner (57) ABSTRACT

A shift control apparatus of a continuously variable transmission for a vehicle comprises sensors for detecting operating conditions of the transmission and a motor connected to the transmission. A controller of the shift control apparatus stores different shift maps and employs one of them according to a driver's command or vehicle driving condition. The controller decides a target value of an input rotation speed of the transmission from an output rotation speed of the transmission and the load condition of a motor on the basis of the shift map and continuously changes a gear ratio of the transmission so that the transmission input rotation speed is adjusted to the target value. The controller can change the rate of the shift speed indicative of a time period of a gear ratio changing operation according to a driver's command.

13 Claims, 10 Drawing Sheets

SHIFT CONTROL APPARATUS FOR CONTINUOUSLY VARIABLE TRANSMISSION

This application is a divisional of application Ser. No. 09/036,041, filed on Mar. 6, 1998 and issued as U.S. Pat. No. 6,019,701 on Feb. 1, 2000. Japanese Patent Application No. 9-321242 filed on Nov. 21, 1997, on which the content and claim for priority of the instant application are based, is hereby incorporated by reference thereto.

BACKGROUND OF THE INVENTION

The present invention relates to a continuously variable transmission, and more particularly to a shift control apparatus thereof.

Generally, a continuously variable transmission (CVT) has been arranged to continuously change the gear ratio. Accordingly, it is possible to execute the shift control of the CVT so as to transfer an engine power to wheels while maintaining the engine rotation speed at a value in which an engine outputs the maximum engine output torque. Further, such a CVT effectively operates to improve the energy consumption or vehicle dynamic performance by properly selecting a gear ratio according to a driving condition of a vehicle. Normally, such a CVT is arranged to execute the shift control in the following manner. First, a target value of the transmission input rotation speed is obtained from the measured engine throttle opening degree and the vehicle speed on the basis of a previously defined shift map relating the combination of the engine throttle opening degree (engine load) and the vehicle speed (transmission output rotation speed). Then, The-gear ratio is continuously changed such that the transmission input rotation speed corresponds to the target value.

Japanese Patent Provisional Publication No. 8-145139 discloses a conventional shift control apparatus of a CVT. The conventional shift control apparatus is arranged to suppress the change of the gear ratio according to the increase of a shift speed, which is a speed for executing shifting. On the other hand, another conventional shift control apparatus is arranged to increase such a shift speed for shifting when the vehicle is quickly accelerated or quickly braked.

However, these conventional shift control apparatuses are arranged to change the shift speed pattern on the basis of the previously defined shift map or to change the shift map with respect to the predetermined shift speed pattern. That is, the conventional shift control apparatuses are arranged to change only one of the shift map and the shift speed pattern. Therefore, it is difficult to execute the shift control according to the vehicle driving condition such as the vehicle speed, the lateral and longitudinal accelerations, the slope degree of a road. Further, since the demand as to the shift response is largely different among individuals (drivers), it is impossible to design the CVT performing a shift speed satisfied by all drivers. It is desirable for desired that the shift response of the CVT to be changed according to the driver's liking. However, the conventional shift control apparatuses have not been arranged to satisfy such driver's liking.

SUMMARY OF THE INVENTION

It is an object of the present invention to provide an improved shift control apparatus that enables a shift speed for changing a gear level to be freely changed according to a driver's command.

A shift control apparatus of a continuously variable transmission according to the present invention is for a vehicle equipped with a motor and comprises a shift map, an input target value deciding section, a gear ratio changing section and a shift speed changing section. The input target value deciding section decides a target value of an input rotation speed of the transmission from an output rotation speed of the transmission and the load condition of a motor on the basis of the shift map. The gear ratio changing section continuously changes a gear ratio of the continuously variable transmission so that the transmission input rotation speed is adjusted to the target value. The shift speed changing section changes the rate of change of the input rotation speed according to a driver's command.

DETAILED DESCRIPTION OF THE INVENTION

Referring to FIGS. 1 to 9, there is shown a first embodiment of a shift control apparatus of a continuously variable transmission in accordance with the present invention.

Figure 1:
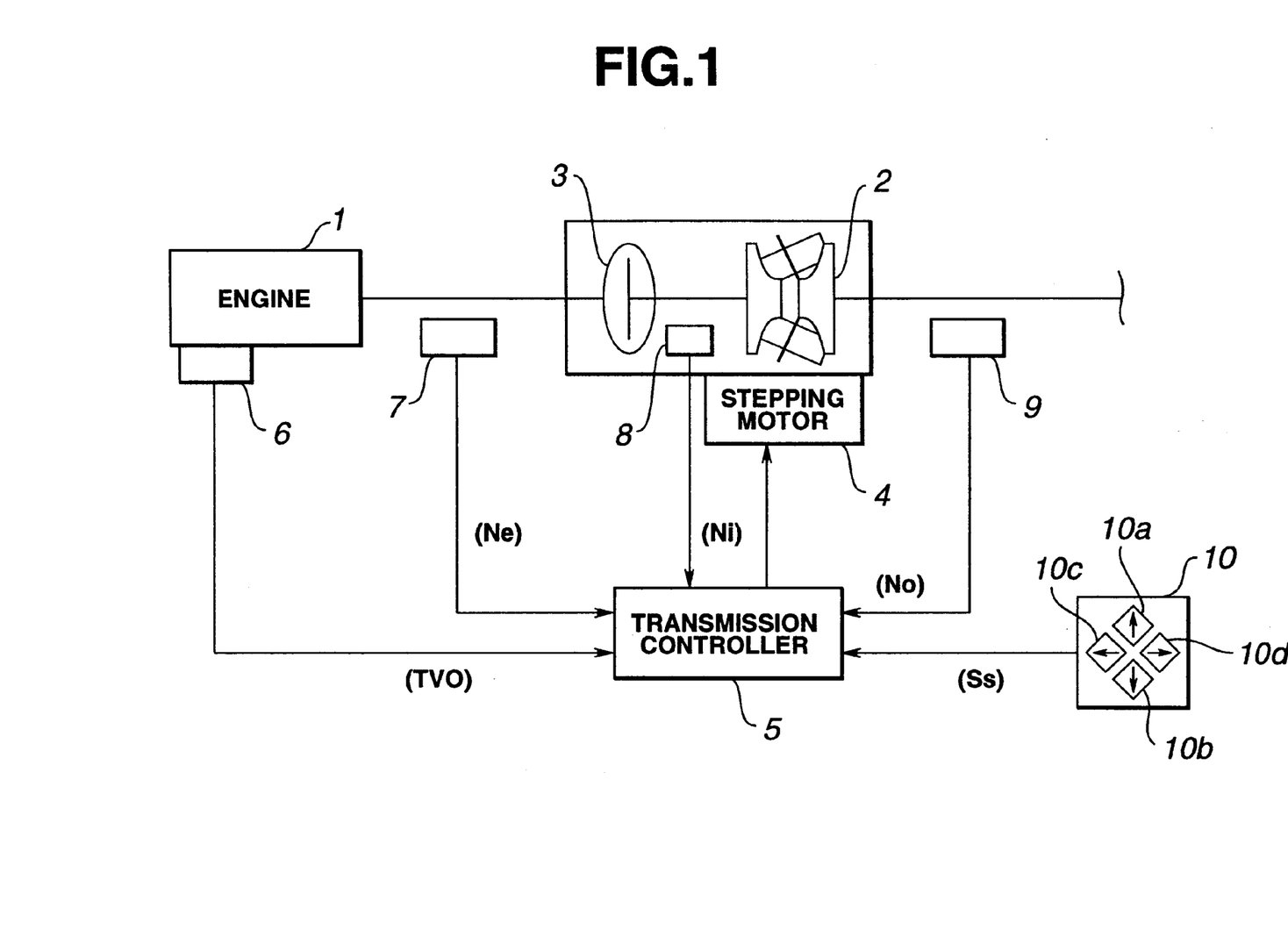
FIG.1 a schematic system view showing shows a first embodiment of a shift control apparatus of a continuously variable transmission (CVT) in accordance with the present invention.

As shown in FIG. 1, a toroidal type continuously variable transmission (CVT) 2 is connected to an engine 1 through a torque converter 3. The torque converter 3 inputs the rotation power of the engine 1 to the CVT 2 upon absorbing a toque fluctuation and increasing torque thereof. The CVT 2 is arranged to continuously vary a gear ratio by controlling a stepping motor 4 through a shift control valve (not shown).

A transmission controller 5 executes such shift control of the CVT 2 through the stepping motor 4. The transmission controller 5 is connected to a throttle opening degree sensor 6, an engine rotation speed sensor 7, a transmission input rotation speed sensor 8 and a transmission output rotation speed sensor 9. The throttle opening degree sensor 6 detects a throttle opening degree TVO of the engine 1 and sends it to the transmission controller 5. The engine rotation speed sensor 7 detects an engine rotation speed Ne of the engine 1 and sends it to the transmission controller 5. The transmission input rotation speed sensor 8 detects an input rotation speed Ni of the CVT 2 and sends it to the transmission controller 5. The transmission output rotation speed sensor 9 detects an output rotation speed No of the CVT 2 and sends it to the transmission controller 5. The shift characteristic selection switch 10 outputs shift characteristic selection signal Ss to the transmission controller 5. The shift characteristic selection switch 10 is manually controlled by a driver in order to determine the shift characteristics of the CVT 2 as follows.

Figure 8:
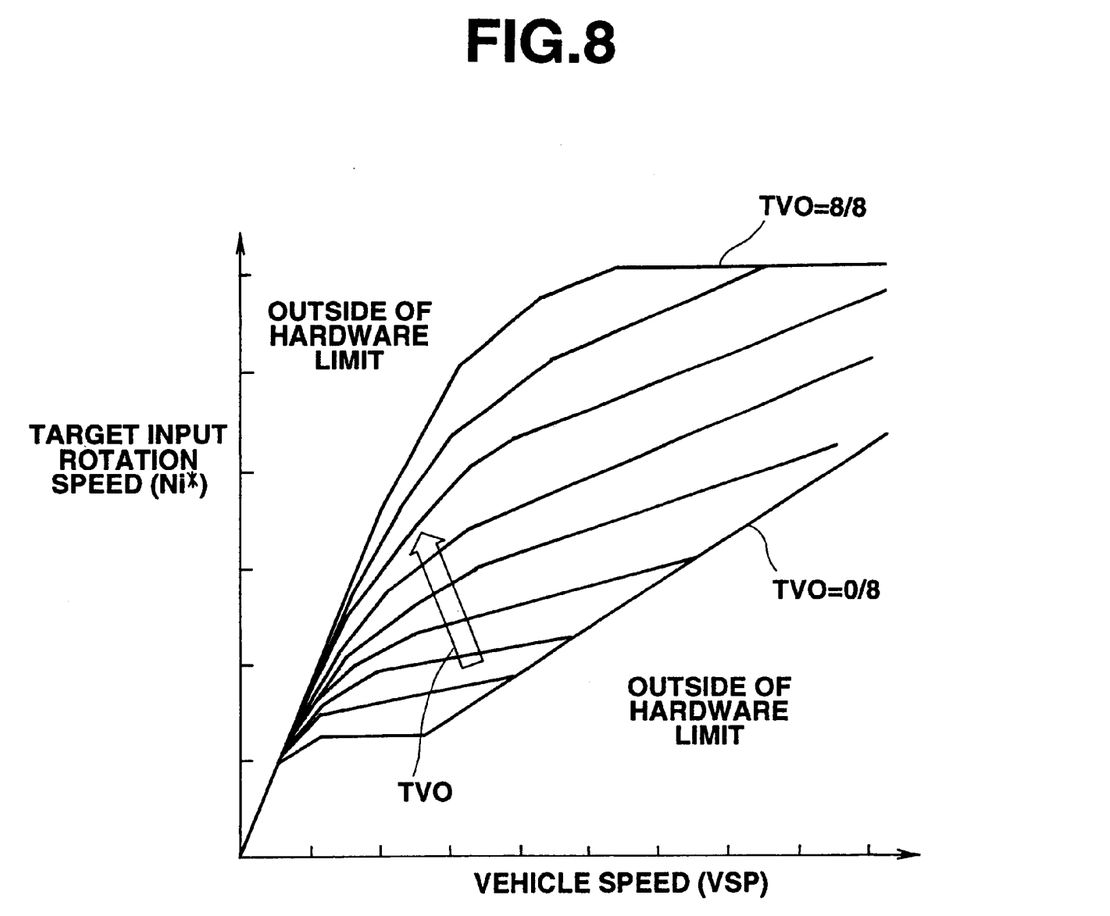
FIG. 8 is a graph showing a shift pattern of the continuously variable transmission.

The transmission controller 5 previously stores a plurality of shift maps such as a shift map for low fuel consumption, another shift map for power operation and another shift map for executing normal pattern shown in FIG. 8. The shift map for low fuel consumption is a so-called economy pattern, which has shift points in the range of the best efficiency of the engine 1, and more particularly in which each shift line by each throttle opening degree is, in turn, shifted downwardly in figure. The shift map for power operation is of a sport type and a so-called power pattern where the shift points are placed at point of highest engine point, and more particularly where each shifting line by each throttle opening degree is in turn shifted upwardly in figure.

The shift characteristic selection switch 10 is arranged to change the shift map to a further power pattern by each depression of a first button 10a and to change the shift map to a further economy pattern by each depression of a second button 10b. More particularly, the transmission controller 5 receives the command signal indicative of the depression of the first and second buttons 10a and 10b and selects the shift map corresponding to the selected shift map (shift pattern).

The transmission controller 5 calculates a target input rotation speed Ni* corresponding to the vehicle speed VSP calculated from the throttle opening degree TVO and the transmission output rotation speed No on the basis of the selected shift map. Further, the transmission controller 5 controls the toroidal type CVT 2 through the stepping motor 4 such that the transmission input rotation speed Ni becomes the target input rotation speed Ni*.

Figure 9:
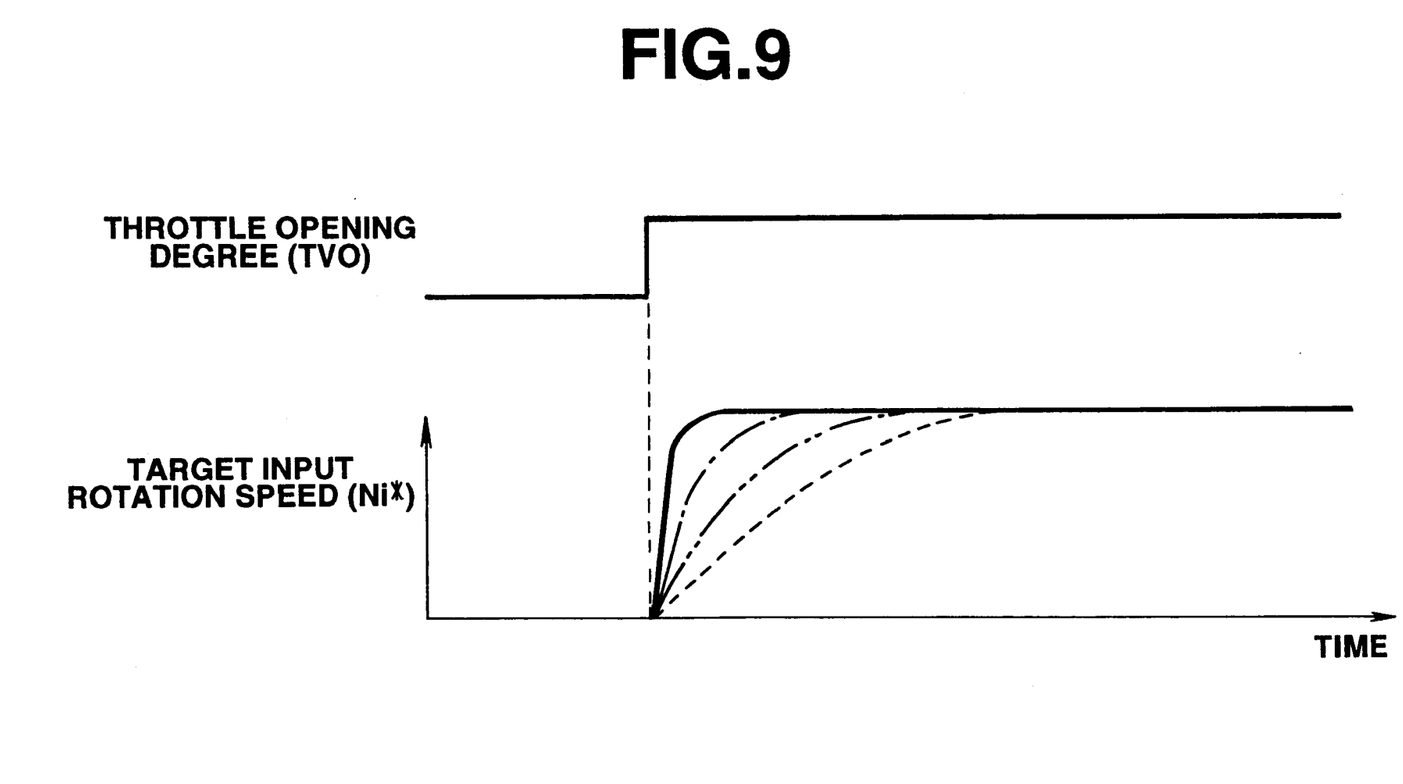
FIG. 9 is a time chart showing various shift speeds which are of the time series change of the transmission input rotation speed target value during the shifting according to the change of the throttle opening degree.

The shift characteristic selection switch 10 further includes third and fourth buttons 10c and 10d. By each depression of the third button 10c, the command for increasing a time period (shift speed) for changing the input rotation speed Ni to the target input rotation speed Ni* is inputted to the transmission controller 5 so as to further smoothly execute the shifting of the CVT 2. That is, as shown in FIG. 9, the shift speed characteristic is changed, for example, from a continuous line to a dot and dash line, from the dot and dash line to an alternate long and two short dashes line, and from the alternate long and two short dashes line to a dotted line. In reverse, by each depression of the fourth button 10d, the command for decreasing the shift speed for changing the input rotation speed Ni to the target input rotation speed Ni* is input to the controller 5 so as to further quickly execute the shifting. The transmission controller 5 changes the shift-control signal in time relation to the speed corresponding to the shift speed command and outputs the changed shift control signal to the stepping motor 4 to execute the commanded shifting.

Accordingly, the selection of the shift characteristic of the toroidal type CVT 2 is completed by the selection of the shift map through the depression by the first and second buttons 10a and 10b and by the selection of the shift speed through the depression of the third and fourth buttons 10c and 10d.

With this arrangement, the shift characteristics of the toroidal type CVT 2 is selected by the combination of the shift map and the shift speed, and it is possible to meet with shift characteristics demanded from various drivers. This largely improves the utility of the toroidal type CVT 2. Further, since the shift control apparatus according to the present invention is arranged to be able to freely change the shift speed by operating the third and fourth buttons 10c and 10d, it is possible to meet the various requirements such as a demand of requesting a quick shift speed for shifting regardless shift shocks and a demand of smoothly executing the shifting prior to the quick shift speed.

Figure 2:
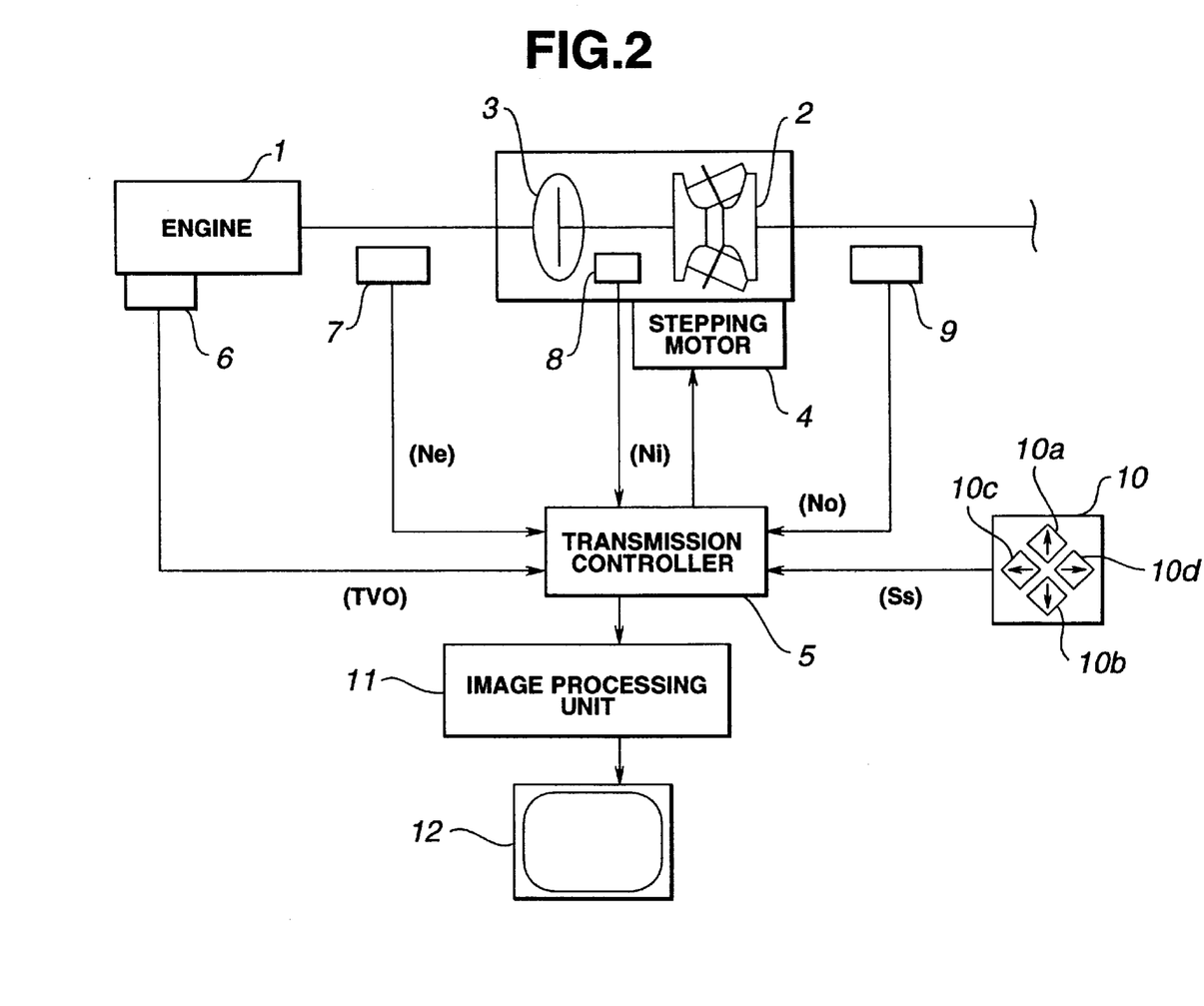
FIG. 2 is a schematic system view showing shows a first embodiment of the shift control apparatus of the CVT in accordance with the present invention.

FIG. 2 shows a modification of the first embodiment in which an image processing unit 11 and a display 12 are added to the construction of the first embodiment. The image processing unit 11 is connected to the transmission controller 11 to receive various information indicative of the condition of the CVT 2. The display 12 is connected to the image processing unit 11 to display the selected shift pattern, the selected shift speed and the present gear level.

Figure 3:
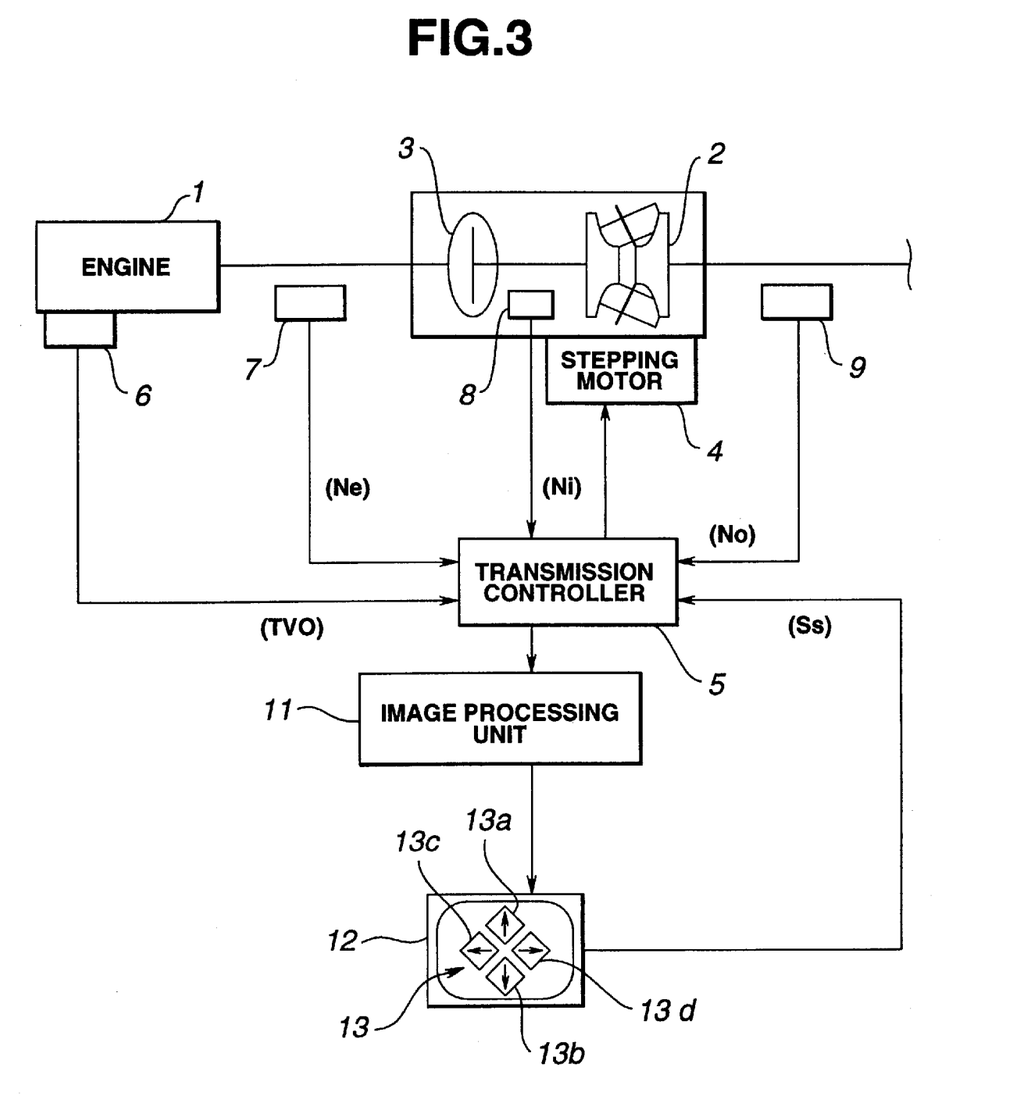
FIG. 3 is a schematic system view showing shows a first embodiment of a shift control apparatus of a continuously variable transmission in accordance with the present invention.

In case that the shift control apparatus comprises the display 12 as shown in FIG. 2, a touch panel 13 corresponding to the shift characteristic selection switch 10 is installed in the display 12 as shown in FIG. 3. The first to fourth buttons 10a to 10d are replaced by first to fourth touch panel portions 13a to 13d. Accordingly, by independently operating the touch panel portions 13a to 13d as similar to the operation of the buttons 10a to 10d, Different shift characteristics including different shift maps and different shift speeds are easily selected.

Figure 4:
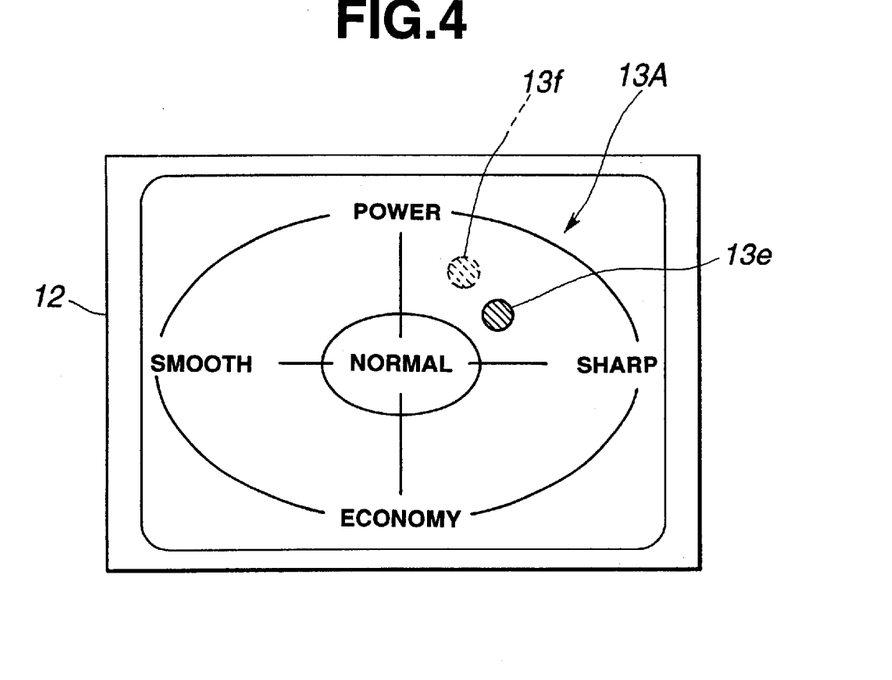
FIG. 4 is a front view of a display showing a shift characteristic changing image plane.

The touch panel 13 on the display 12 may be arranged to represent a two dimensional image plane 13A having a vertical axis indicative of the shift map and a horizontal axis indicative of the shift speed, as shown in FIG. 4.

In this two-dimensional image plane 13A of FIG. 4, "POWER" discloses a tendency of the powerful pattern, and "ECONOMY" discloses a tendency of the economy pattern, "SMOOTH" discloses a tendency of a low speed for changing the gear level, "SHARP" discloses a tendency of a high speed for changing the gear level, and "NORMAL" discloses a normal pattern which performs an intermediate characteristic between the powerful pattern and the economy pattern and a medium shift speed. In this case, by depressing a proper point 13e on the two-dimensional image plane through the touch panel 13, a shift characteristic constructed by a combination of the corresponding shift map and the shift speed is selected.

With this arrangement in the first embodiment according to the present invention, the selection of the shift characteristic including the shift map and the shift speed is executed by one action. This largely improves the facility of the shift control apparatus.

By displaying the point 13e corresponding to a point depressed by a finger of a driver on the two-dimensional image plane, the driver can always recognize the present selected shift characteristic form the display 12.

Preferably, a point 13f corresponding to the previously selected shift characteristic may be displayed on the display 12 by a paler image for a predetermined time period such as 2 seconds. By this arrangement, it is possible for the driver to select the next shift characteristic with reference to the previous and present selected points 13f and 13e.

Figure 5:
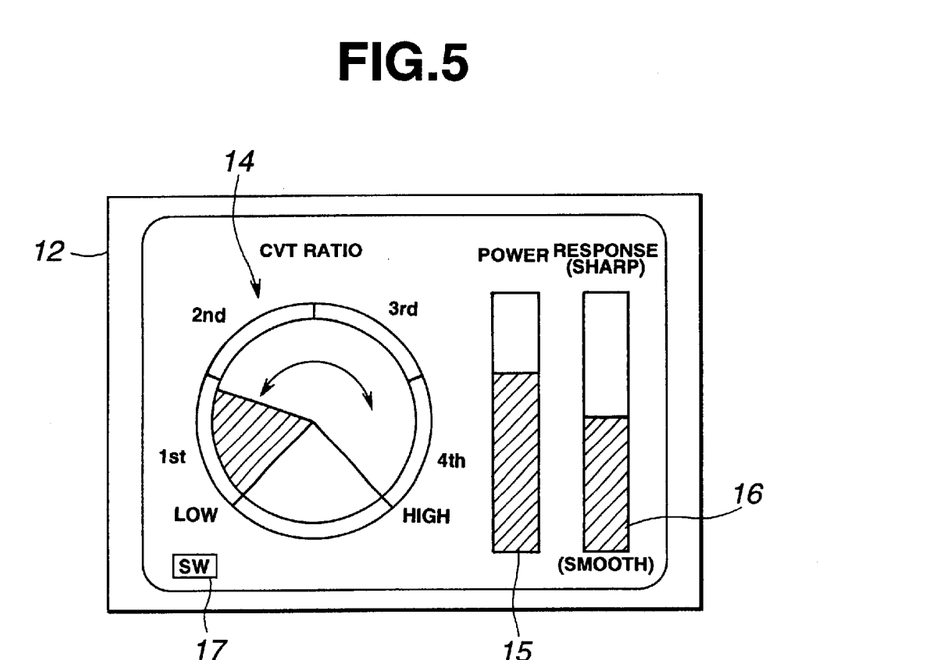
FIG. 5 is a front view of the display showing a shift condition displaying image plane.

Further, the shift control apparatus is arranged to properly change the image plane of the display 12 from the two-dimensional image plane 13A corresponding to the touch panel shown in FIG. 4 to an image plane 14 indicating the present shift condition shown in FIG. 5. In this image plane 14, "LOW" represents a lowest speed gear level and "HIGH" represents a highest speed gear level. "1st" to "4th" represent the respective speed gear levels obtained by properly dividing the continuously-variable gear ratio into four levels.

The display 12 further display a bar chart 15 indicative of the selected shift map and a bar chart indicative of the selected shift speed, in addition to the image plane 14 indicative of the speed gear condition as shown in FIG. 5. This arrangement enables the driver to simultaneously recognize the shift condition, the selected shift map, and the shift speed.

A switch panel portion 17 is disposed at an under portion of the shift condition displaying image plane 14. By depressing this switch panel portion 17, the displayed content on the display 12 is changed from the shift condition display image plane 14 to one of the two-dimensional image planes (characteristic changing image planes) 13A shown in FIGS. 3 and 4. Further, when the shift characteristic changing image plane 13A is not touched for a predetermined time, the shift characteristic changing image plane 13A is automatically changed to the shift condition display image plane 14.

With this arrangement, it is possible to display both the shift characteristic changing image plane 13A and the shift condition displaying image plane 14 by means of one display 12.

As mentioned above, normally the shift condition displaying image plane 14, which should be always monitored, is displayed on the display 12. Only when the shift characteristic changing image plane 13A is required for the changing operation of the shift characteristic, the shift characteristic changing image plane 13A is displayed on the display 12 according to the depression of the touch panel portion 17 by the driver. The shift characteristic changing image plane 13A is automatically changed to the shift condition displaying image plane 14 if left for a predetermined time after the changing operation. Therefore, the switching between the shift characteristic changing image plane 13A and the shift condition display image plane 14 is effectively executed. This improves the operational facility.

Since the shift condition displaying image plane 14 includes the bar chart 15 representative of the selected shift map and the bar chart 16 representative of the selected shift speed, even when the display 12 displays the image plane 14, the driver can recognize the selected shift map and the selected shift speed.

Figure 6:
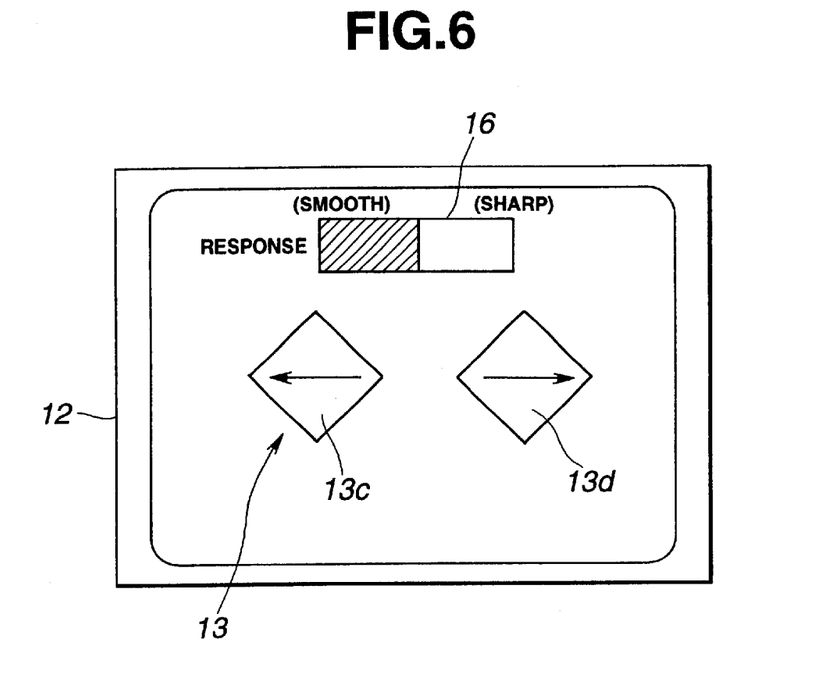
FIG. 6 is a front view of the display showing shift characteristic changing image plane in the manual mode.

Some continuously variable transmissions provide a manual mode in which a plurality of gear levels formed by diving the continuously variable gear ratio are manually changed. Even in such a manual mode, it is preferable that a driver can freely select the shift characteristic of the shift speed so as to ensure the above mentioned advantages in the continuously variable mode. In such a case, the selection of the shift map is not executed. Therefore, a shift characteristic changing image plane 13A may be displayed such that only the shift speed control buttons 13c and 13d are displayed on the display 12 as shown in FIG. 6. During the manual mode, the shift speed is changed by depressing these buttons 13c and 13d. Further, a bar chart 16 representative of the shift speed as similar to that in FIG. 5 is displayed on the display 12 so that the driver can recognize the selected shift speed.

Figure 7:
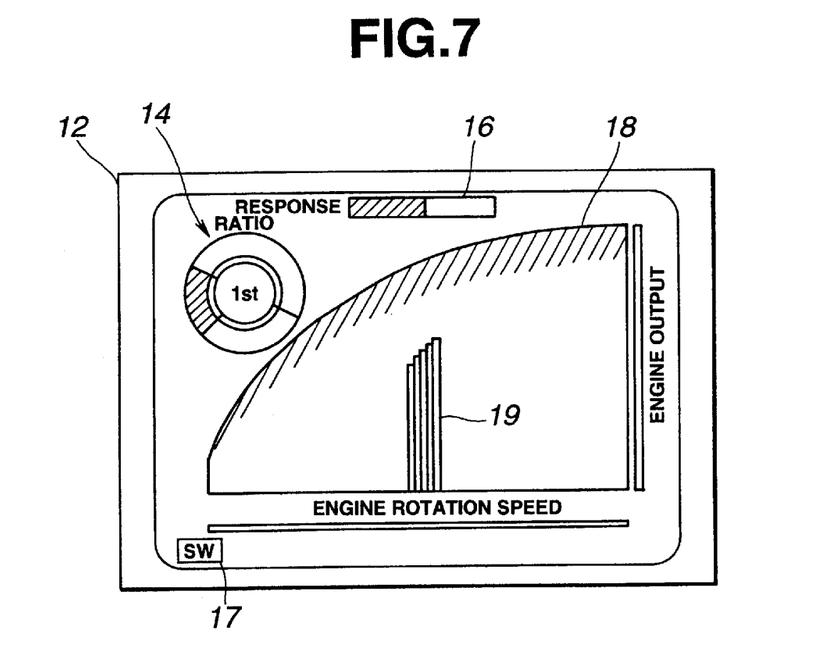
FIG. 7 is a front view of the shift condition displaying image plane in the manual mode.

In order to ensure the advantages in case of the above-mentioned continuously variable transmission, when the driver does not touch the shift characteristic changing image plane 13A for a predetermined time, the image plane 13A is automatically changed to the shift condition displaying image plane 14 for the manual mode shown in FIG. 7 on the basis of the decision that the changing operation of the shift characteristic is finished. Although the shift condition displaying image plane 14 for the manual mode is basically the same as the shift condition display image plane for the continuously variable shifting mode, a manually selected gear level such as 1st to 4th is indicated at a center portion of the gear ratio displaying portion so that the driver can recognize the present actual gear ratio and the selected gear level as shown in FIG. 7. The shift condition displaying image plane 14 for the manual mode further displays a maximum output curve 18 of the engine 1 and a present engine output 19 so that the driver can recognize the engine operating condition from the image plane 14. Further, a bar chart 16 similar to that of FIG. 5 is displayed so that the driver can monitor the selected shift speed from the image plane.

Additionally, the shift condition displaying image plane 14 for the manual mode includes a switch panel portion 17 as is similar to that of FIG. 5. By depressing this switch panel portion 17, the image plane of the display 12 is changed from the shift condition display image plane 14 to the shift characteristic changing image plane 13A. When the driver does not touch the shift characteristic changing image plane 13A for a predetermined time, the image plane of the display 12 is automatically changed from the shift characteristic changing image plane 13A to the shift condition displaying image plane 14 of FIG. 7. Accordingly, the shift condition displaying image plane 14 of FIG. 7 is normally displayed on the display 12. Only when the driver requires the shift characteristic changing image plane 13A of FIG. 6 for executing the changing operation of the shift speed, the shift condition displaying image plane 14 is changed to the shift characteristic changing image plane 13A. After the changing operation of the shift speed, the image plane of the display 12 is automatically changed to the shift condition displaying image plane 14 of FIG. 7. Therefore, the switching between the shift characteristic changing image plane 13A and the shift condition displaying image plane 14 is efficiently executed by minimum operation steps. Accordingly, the operational facility of the shift control apparatus is largely improved.

Since the bar chart 16 representative of the selected shift speed is displayed in the shift condition display image plane 14, the driver can easily recognize the selected shift speed from the shift condition display image plane 14.

Figure 10A:
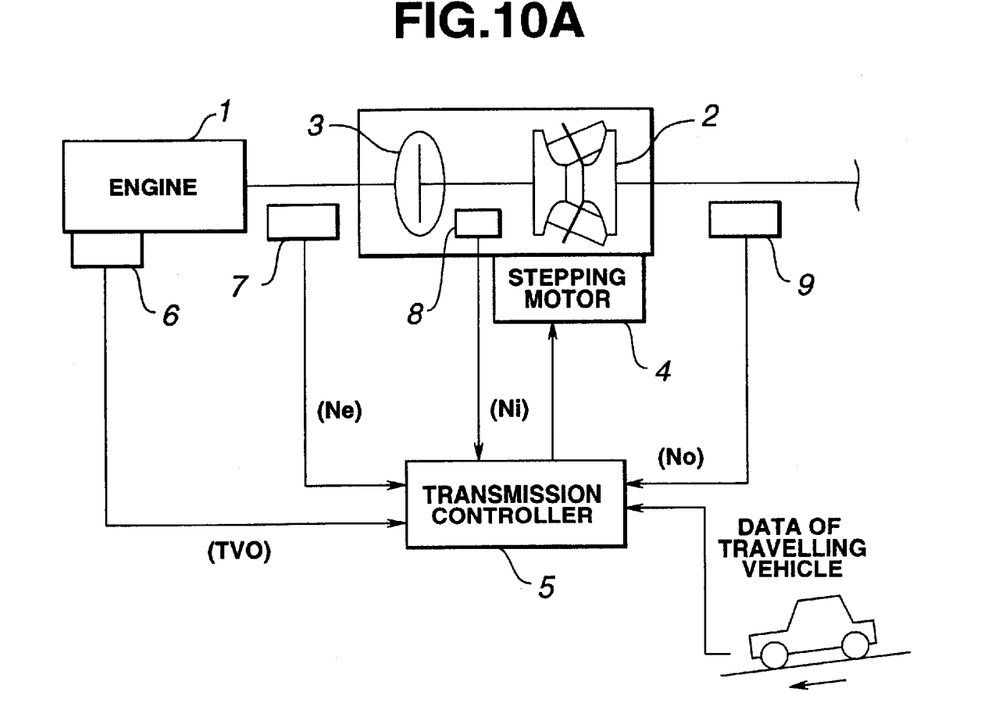
FIG. 10A is a schematic system view showing shows a second embodiment of a shift control apparatus of a continuously variable transmission in accordance with the present invention.
Figure 10B:
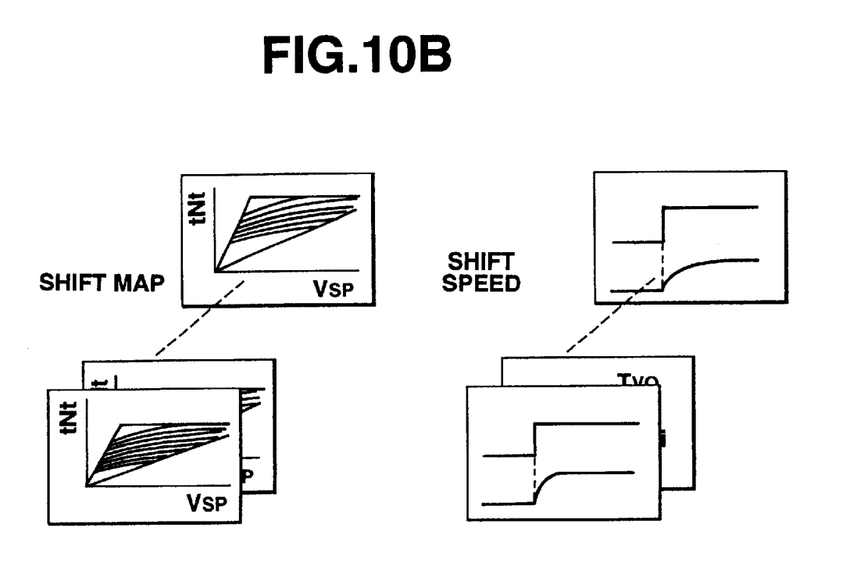
FIG. 10B is an explanatory view for explaining shift control operation executed in the second embodiment of FIG. 10A.

Referring to FIGS. 10A and 10B, there is shown a second embodiment of the shift control apparatus of the continuously variable transmission in accordance with the present invention. The same components and elements as those of the first embodiment shown in FIGS. 1 to 9 are designated by the same numerals, and the explanation thereof is omitted herein.

As shown in FIG. 10A, the transmission controller 5 receives various data indicative of the driving condition of the vehicle from various sensors (not shown), in addition to the throttle opening degree TVO, the engine rotation speed Ne, the input rotation speed Ni and the output rotation speed No. The data indicative of the vehicle driving condition includes a vehicle speed, throttle operation speed, lateral and longitudinal accelerations of the vehicle body and slope of a traveling road.

The transmission controller 5 has previously stored different shift maps and different shift speed patterns, as shown in FIG. 10B. That is, the different shift maps stored in the transmission controller 5 are map data like as the normal pattern map shown in FIG. 8, the power pattern map and the like. Further, the different shift speed patterns are pattern data like as the pattern shown in FIG. 9.

Hereinafter, the manner of operation of the shift control apparatus of the present embodiment will be discussed.

When the driver changes the throttle opening degree TVO, the transmission controller 5 selects a proper shift map and a proper shift speed pattern from the different shift maps and the different shift speed patterns in accordance with the driving condition of the vehicle. Since both of the shift map and the shift speed pattern are changed according to the change of the throttle opening degree TVO, the driver can ensure a wide ranged shift characteristics adapted to the driving condition of the vehicle. The wide range shift characteristics ranges from a high response and high acceleration shifting under the high engine rotation speed to an energy-saving and smooth shifting under the low engine rotation speed.

For example, even if the throttle opening degree TVO and the throttle operation speed are constant, the running resistance of the vehicle increases according to the increase of the vehicle speed. Therefore, the shifting operation is quickly executed to increase the engine output for ensuring the driving force against the running resistance. This ensures that the driver is satisfied with acceleration. Wherein the settings and combinations of the shift map and the shift speed pattern for determining the change amount of the engine rotation speed are previously determined according to the characteristic of the vehicle.

When the driver slightly increases the throttle opening degree TVO for increasing the driving force during the driving, the shift characteristic for preventing the radical change of the engine rotation speed is realized by changing the shift speed according to the throttle operation speed without changing the shift map. That is, the shift map is changed such that the shift speed is high when the throttle operation speed is high, and the shift speed is low when the throttle operation speed is low. This ensures the linear relationship between the throttle operation and the engine rotation speed and the change of the vehicle speed.

When the driver largely increases the throttle opening degree TVO, a high rotation-speed type shift map is selected so as to generate large change in driving force. Simultaneously, the shift speed is changed according to the throttle operation speed. For example, the shift speed is set high when the throttle operation speed is high, and the shift speed is set low when the throttle operation speed is low. This ensures the smooth acceleration meeting with the driver's demand.

On the other hand, in case that a vehicle receives the lateral and longitudinal accelerations, more particularly when a vehicle attaching importance to riding comfort tends to generate acceleration in the pitching direction, that is, the longitudinal direction, the CVT installed to the vehicle operates to suppress the change of the driving force due to the change of the engine rotation speed and to decrease the shift speed. This arrangement functions to suppress the radical movement of the load in the longitudinal direction due to the fluctuation of acceleration.

In case that the vehicle equipped with the CVT 2 tends to generate acceleration in the lateral direction, to prevent the vehicle from receiving a force over the tire gripping limit caused by the radical change of the driving force, a shift map applicable to the range of the change of the allowable engine rotation speed due to the lateral acceleration is selected, and the shift speed is decreased to suppress the radical change of the driving force. This arrangement ensures the stability of the vehicle behavior. The changes and combinations of the allowable rotation speed range and the shift map have been previously determined according to the characteristic of the vehicle.

Next, when it is detected or predicted that a gradient of the road is increasing, a shift map, in which the change amount of the engine rotation speed with respect to the throttle operation amount is increased as compared with that on the flat road, is selected so that the vehicle performs the shift characteristic pattern for increasing the driving force. Further, the shift speed is changed according to the change of the throttle change speed. For example, the shift speed is set high when the throttle operation speed is high, and the shift speed is set low when the throttle operation speed is low. This arrangement enables the vehicle to be driven by the same driving operation even on an up-slope road or down-slope road.

In contrast, when it is detected or predicted that the vehicle travels down-slope road, a shift map, in which the change of the engine rotation speed is small, is selected such that the change of the driving force is small with respect to the change of the engine rotation speed. That is, since the negative slope resistance is being applied to the vehicle, it is necessary to prevent the unexpected increase of the vehicle speed due to the depression of the acceleration pedal. In addition, the shift speed is decreased to lower the responsibility. With this arrangement, when the driver releases his or her foot from the acceleration pedal, the up-shift is prevented according to the selected shift map. Further, by slowly operating the engine brake through the decrease of the shift speed, the operation amount of the driver is decreased.

Figure 11A:
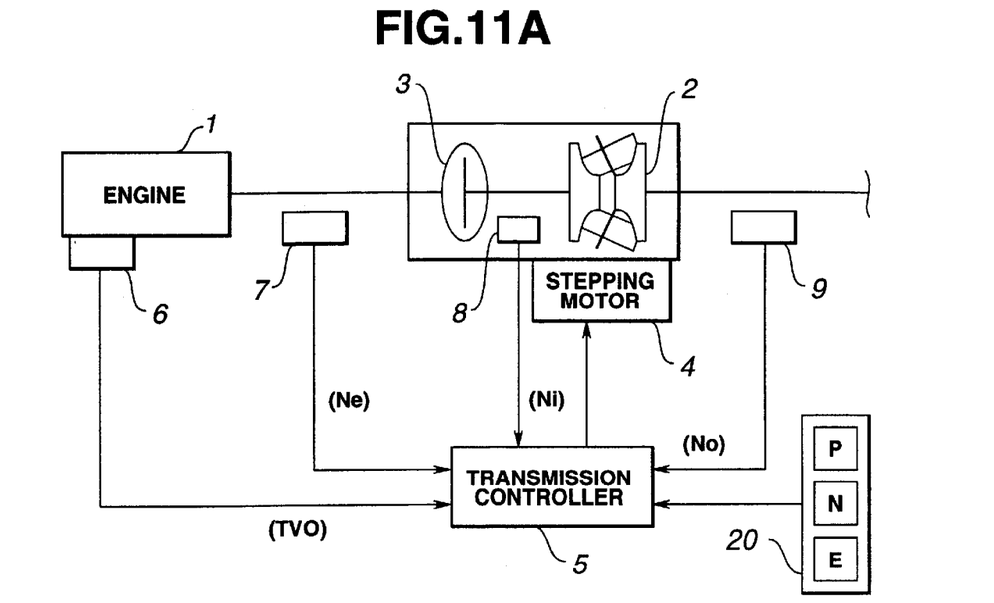
FIG. 11A is a schematic system view showing shows a third embodiment of a shift control apparatus of a continuously variable transmission in accordance with the present invention.
Figure 11B:
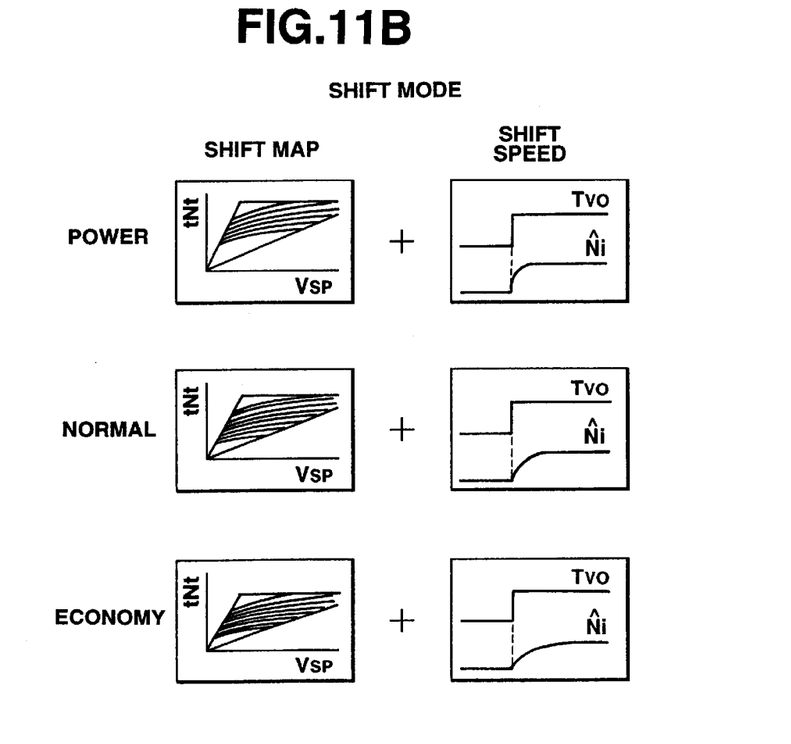
FIG. 11B is an explanatory view for explaining the shift control operation executed in the third embodiment of FIG. 11A.

Referring to FIGS. 11A and 11B, there is shown a third embodiment of the shift control apparatus according to the present invention. The parts and elements as same as those in FIGS. 1 to 3 and 10 are designated by same reference numerals, and the explanation thereof will be omitted herein.

As shown in FIG. 11A, the transmission controller 5 is arranged to execute the shift control according to the shift mode selected by a driver through a mode select switch 20. The shift mode includes three shift mode such as "POWER" mode, "ECONOMY" mode and "NORMAL" mode, and each mode is previously defined in the transmission controller 5 as a predetermined combination of the shift map and the shift speed, as shown in FIG. 11B. These combinations correspond to the previously mentioned power pattern, economy pattern and intermediate pattern between the power and economy patterns.

With this arrangement, the driver can ensure the change of the shift change characteristics according to his or her liking. Particularly, this embodiment is preferably applied to a case where driver desires to always select one shift characteristic regardless the driving condition of the vehicle. Although this third embodiment has been shown and described such that the selection of the shift mode is executed by means of the mode selection switch 20, it will be understood that the mode selection switch 20 may be formed by at the touch panel 13 on the display 12 as is similar to FIGS. 3 and 4.

Figure 12A:
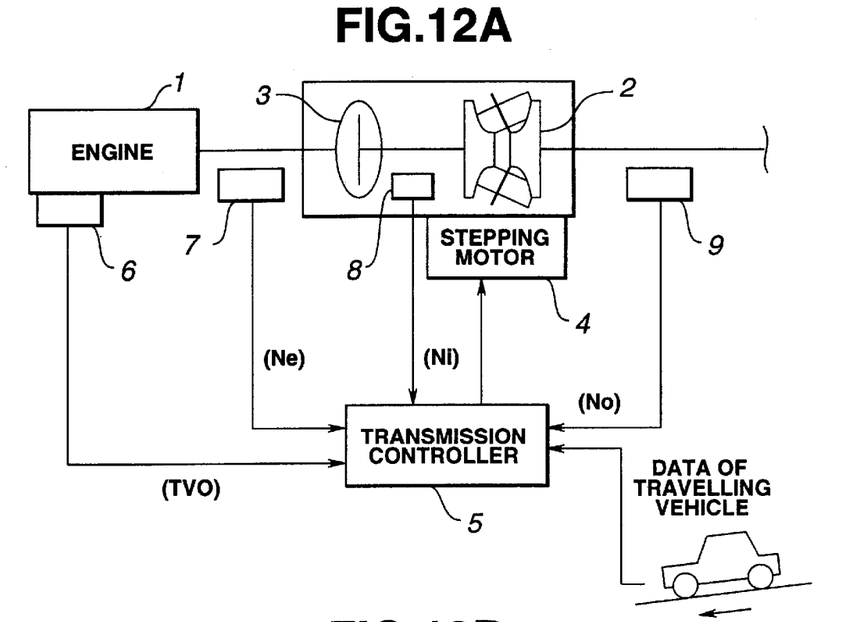
FIG. 12A is a schematic system view showing shows a fourth embodiment of a shift control apparatus of a continuously variable transmission in accordance with the present invention.
Figure 12B:
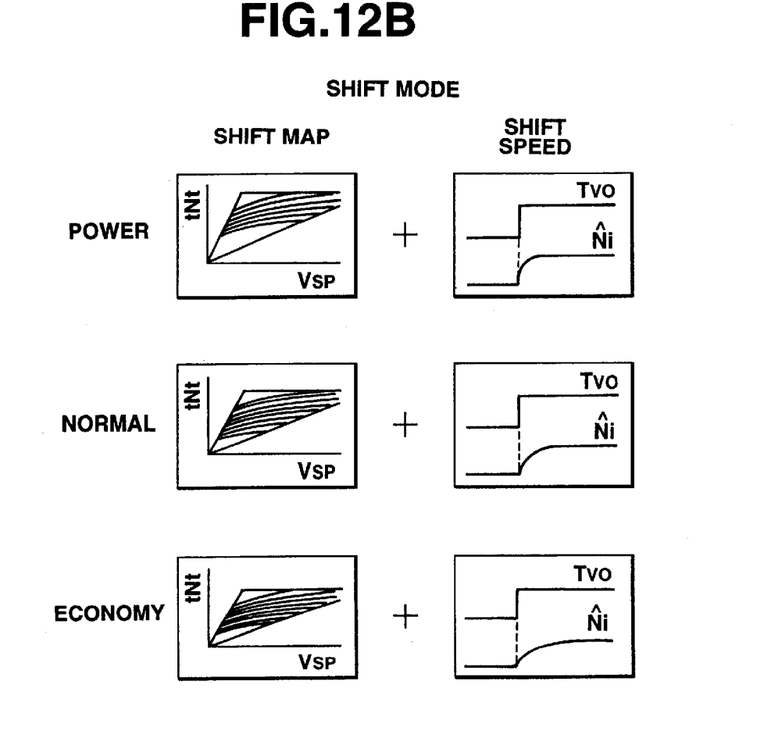
FIG. 12B is an explanatory view for explaining mode patterns employed in the fourth embodiment of FIG. 12A.

Referring to FIGS. 12A and 12B, there is shown a fourth embodiment of the shift control apparatus of the continuously variable transmission according to the present invention.

The construction of the fourth embodiment is the same as that of the second embodiment shown in FIG. 10A. The fourth embodiment is arranged to define the shift modes as is the same as those of the third embodiment. That is, the "POWER" mode, "NORMAL" mode and "ECONOMY" mode have been previously stored in the transmission controller 5. The transmission controller 5 is arranged to select one of the three modes according to various data as to the traveling vehicle. Therefore, the transmission controller 5 automatically selects the shift characteristic according to the driving condition of the vehicle without the selection by the driver. Further, since the number of the combinations of the shift map and the shift speed is set small such as three in this fourth embodiment, the load to the transmission controller 5 is small.

With the thus arranged embodiments of the shift control apparatus according to the present invention, it is possible to finely execute the shift control according to the vehicle traveling condition or driver's command. Therefore, it is possible to adapt the shift control to the various conditions such as the quick acceleration or hill climbing and to generate an optimum driving force according to the driver's command.

What is claimed is:

1. A shift control apparatus of a continuously variable transmission for a vehicle, comprising:
   a plurality of shift maps;
   a plurality of shift speed patterns, one of said shift patterns being employed to adjust a transmission input rotation speed to a target value;
   characteristic selecting means for selecting one of the plurality of shift maps and one of the Plurality of shift speed patterns according to a driving condition of the vehicle; and
   input target value deciding means for deciding the target value of the transmission input rotation speed from the transmission output rotation speed and a load condition of a motor connected the continuously variable transmission on the basis of the selected shift map.

2. A shift control apparatus as claimed in claim 1, wherein a plurality of combinations of the shift maps and the shift speed patterns are stored, and wherein one of the combinations is selected according to the vehicle driving condition.

3. A shift control apparatus as claimed in claim 1, further comprising control means for controlling the transmission input rotation speed at the target value according to the selected shift map and the selected shift speed pattern.

4. A shift control apparatus as claimed in claim 1, wherein said characteristic selecting means selects the shift speed pattern such that a shift speed is increased according to an increase of a vehicle speed.

5. A shift control apparatus as claimed in claim 1, wherein said characteristic selecting means selects a high rotation-speed type shift map when a throttle opening degree of the motor is largely increased.

6. A shift control apparatus as claimed in claim 5, wherein said characteristic selecting means selects the shift speed pattern such that a shift speed is increased according to an increase of a throttle operation speed.

7. A shift control apparatus as claimed in claim 1, wherein said characteristic selecting means selects the shift speed pattern for quickly executing a shifting operation when a running resistance of the vehicle increases according to an increase of an vehicle speed.

8. A shift control apparatus as claimed in claim 1, wherein said characteristic selecting means selects the shift speed pattern such that a shift speed is changed according to a change of a throttle change speed.

9. A shift control apparatus as claimed in claim 1, wherein said characteristic selecting means selects a shift map in which a change of a driving force is small with respect to a change of an engine rotation speed when the vehicle travels a down-slope road.

10. A shift control apparatus as claimed in claim 9, wherein said characteristic selecting means selects the shift speed pattern such that a shift speed is decreased to lower its responsibility.

11. A shift control apparatus as claimed in claim 1, wherein said characteristic selecting means selects the shift map functioning to suppress a change of a driving force due to a change of the engine rotation speed and the shift speed pattern functioning to decrease a shift speed when the vehicle generates acceleration in the longitudinal direction.

12. A shift control apparatus as claimed in claim 1, wherein said characteristic selecting means selects the shift map applicable to a range of a change of an allowable engine rotation speed due to the lateral acceleration and the shift speed pattern functioning to suppress a radical change of a driving force when the vehicle generates acceleration in the lateral direction.

13. A shift control apparatus of a continuously variable transmission for a vehicle, comprising:
   a sensor detecting a driving condition of the vehicle;
   an actuator varying a transmission input rotation speed of the continuously variable transmission at an input target value; and
   a controller connected to said sensor and said actuator, said controller including a storing section which stores a plurality of shift maps and a plurality of shift speed patterns, said controller selecting one shift map and one shift speed pattern according to the driving condition, said controller deciding the target value of the transmission input rotation speed on the basis of the transmission output rotation speed, a load condition of a motor of the vehicle and the selected shift map, said controller controlling said actuator so that the transmission input rotation speed is adjusted at the target value according to the selected shift map and the selected shift speed pattern.

* * * * *